US012776070B2

(12) United States Patent
Li et al.

(10) Patent No.: US 12,776,070 B2
(45) Date of Patent: Oct. 27, 2026

(54) IMAGE SYNTHESIS METHOD AND SYSTEM

(71) Applicant: Alibaba Damo (Hangzhou) Technology Co., Ltd., Hangzhou (CN)

(72) Inventors: Binzhe Li, Beijing (CN); Zhao Wang, Beijing (CN); Yan Ye, San Diego, CA (US); Shiqi Wang, Hong Kong (HK)

(73) Assignee: SIM IP 5 LLC, Sioux Falls, SD (US)

(*) Notice: Subject to any disclaimer, the term of this patent is extended or adjusted under 35 U.S.C. 154(b) by 304 days.

(21) Appl. No.: 18/482,878

(22) Filed: Oct. 7, 2023

(65) Prior Publication Data

US 2024/0119637 A1 Apr. 11, 2024

(30) Foreign Application Priority Data

Oct. 10, 2022 (CN) ......................... 202211236540.0

(51) Int. Cl.

*G06T 9/00* (2006.01)
*G06T 5/70* (2024.01)
*G06T 7/00* (2017.01)
*G06V 10/75* (2022.01)
*H04N 7/15* (2006.01)

(52) U.S. Cl.

CPC .................. *G06T 9/00* (2013.01); *G06T 5/70* (2024.01); *G06T 7/0002* (2013.01); *G06V 10/758* (2022.01); *H04N 7/15* (2013.01); *G06T 2207/20081* (2013.01); *G06T 2207/30168* (2013.01)

(58) Field of Classification Search

CPC ........... G06T 9/00; G06T 5/70; G06T 7/0002; G06T 2207/20081; G06T 2207/30168; G06V 10/758; H04N 7/15

USPC .......................................................... 382/232

See application file for complete search history.

(56) References Cited

U.S. PATENT DOCUMENTS

2020/0226729 A1* 7/2020 Zhang ..................... G06T 7/521

FOREIGN PATENT DOCUMENTS

| | | | |
|---|---|---|---|
| CN | 107610077 | A | 1/2018 |
| CN | 107707831 | A | 2/2018 |
| CN | 109829887 | A | 5/2019 |
| CN | 112367459 | A | 2/2021 |
| EP | 3770849 | A1 | 1/2021 |

OTHER PUBLICATIONS

Son, Sanghyun, et al. "Toward real-world super-resolution via adaptive downsampling models." IEEE transactions on pattern analysis and machine intelligence 44.11 (2021): 8657-8670. (Year: 2021).*

First Office Action issued in corresponding Chinese Application No. 202211236540.0 on Mar. 17, 2025, (11 pages).

Office Action issued in corresponding Chinese Application No. 202211236540.0 on Aug. 13, 2025, (12 pages).

* cited by examiner

*Primary Examiner* — Jonathan S Lee

(74) *Attorney, Agent, or Firm* — ALSTON & BIRD LLP

(57) ABSTRACT

The present disclosure provides methods and apparatuses for performing image synthesis. An exemplary image synthesis method includes: acquiring a first image and a second image an image quality of the first image being higher than an image quality of the second image; obtaining a compressed image by compressing the first image; and synthesizing at least a part of the compressed image with at least a part of the second image.

20 Claims, 8 Drawing Sheets

800

200A

200B

500A

500B

500C

IMAGE SYNTHESIS METHOD AND SYSTEM

CROSS-REFERENCE TO RELATED APPLICATIONS

The disclosure claims the benefits of priority to Chinese Application No. 202211236540.0, filed on Oct. 10, 2022, which is incorporated herein by reference in its entirety.

TECHNICAL FIELD

The present disclosure generally relates to image processing, and more particularly, to methods and apparatuses for image synthesis, such as image synthesis used in video conference applications.

BACKGROUND

Image synthesis technique is used to extract at least a part of an image area from each of at least two frames of images and synthesize the extracted image areas to obtain a synthesized image. However, the extracted image areas may have different image qualities, resulting in a relatively abrupt and disharmonious synthesized image.

For example, in recent years, a significant amount of demand for video communication has emerged, accompanied by the popularity of mobile devices and high-speed networks. In order to protect privacy or improve immersion and enjoyment, an image/video synthesis technique is widely applied to video communication applications such as video conferences, video calls and live broadcast platforms. For example, a portrait part in an image collected by a shooting apparatus and a preset virtual background may be synthesized. However, the image collected by the shooting apparatus is limited by factors such as compression operations during network transmission, making it difficult to achieve high image quality. The image quality of the image collected by the shooting apparatus can be different from the image quality of the virtual background, resulting in different qualities in different areas of the synthesized image and further causing a relatively abrupt and disharmonious visual effect.

SUMMARY OF THE DISCLOSURE

Embodiments of the disclosure provide an image synthesis method. The method can include: acquiring a first image and a second image, an image quality of the first image being higher than an image quality of the second image; obtaining a compressed image by compressing the first image; and synthesizing at least a part of the compressed image with at least a part of the second image.

Embodiments of the disclosure provide an electronic device. The electronic device can include: a memory storing a set of instructions; and one or more processors configured to execute the set of instructions to cause the device to perform: acquiring a first image and a second image, an image quality of the first image being higher than an image quality of the second image; obtaining a compressed image by compressing the first image; and synthesizing at least a part of the compressed image with at least a part of the second image.

Embodiments of the disclosure provide a non-transitory computer readable medium storing a set of instructions that is executable by one or more processors of an apparatus to cause the apparatus to execute an image synthesis method. The method can include: acquiring a first image and a second image, an image quality of the first image being higher than an image quality of the second image; obtaining a compressed image by compressing the first image; and synthesizing at least a part of the compressed image with at least a part of the second image.

Embodiments of the disclosure provide an image synthesis method. The method can include: acquiring a first image and a second image, an image quality of the first image being higher than an image quality of the second image; determining a processing parameter for reducing the image quality of the first image, and processing the first image by using the processing parameter; and synthesizing the processed first image with the second image.

Embodiments of the disclosure provide an electronic device. The electronic device can include: a memory storing a set of instructions; and one or more processors configured to execute the set of instructions to cause the device to perform: acquiring a first image and a second image, an image quality of the first image being higher than an image quality of the second image; determining a processing parameter for reducing the image quality of the first image, and processing the first image by using the processing parameter; and synthesizing the processed first image with the second image.

Embodiments of the disclosure provide a non-transitory computer readable medium storing a set of instructions that is executable by one or more processors of an apparatus to cause the apparatus to execute an image synthesis method. The method can include: acquiring a first image and a second image, an image quality of the first image being higher than an image quality of the second image; determining a processing parameter for reducing the image quality of the first image, and processing the first image by using the processing parameter; and synthesizing the processed first image with the second image.

Embodiments of the disclosure provide a video conference method. The method can include: receiving a foreground video frame sent by a client participating in a video conference, and acquiring a background image synthesized with the foreground video frame, an image quality of the foreground video frame being lower than an image quality of the background image; compressing the background image to obtain a compressed background image; synthesizing the compressed background image with the foreground video frame to obtain a synthesized video frame; and transmitting the synthesized video frame to the client, the synthesized video frame being used for display by the client.

Embodiments of the disclosure provide an electronic device. The electronic device can include: a memory storing a set of instructions; and one or more processors configured to execute the set of instructions to cause the device to perform: receiving a foreground video frame sent by a client participating in a video conference, and acquiring a background image synthesized with the foreground video frame, an image quality of the foreground video frame being lower than an image quality of the background image; compressing the background image to obtain a compressed background image; synthesizing the compressed background image with the foreground video frame to obtain a synthesized video frame; and transmitting the synthesized video frame to the client, the synthesized video frame being used for display by the client.

Embodiments of the disclosure provide a non-transitory computer readable medium storing a set of instructions that is executable by one or more processors of an apparatus to cause the apparatus to execute an image synthesis method. The method can include: receiving a foreground video frame sent by a client participating in a video conference, and acquiring a background image synthesized with the foreground video frame, an image quality of the foreground video frame being lower than an image quality of the background image; compressing the background image to obtain a compressed background image; synthesizing the compressed background image with the foreground video frame to obtain a synthesized video frame; and transmitting the synthesized video frame to the client, the synthesized video frame being used for display by the client.

Embodiments of the disclosure provide a video conference method. The method can include: receiving video frames sent by at least two clients participating in a video conference; the video frames comprising a first video frame and a second video frame, an video frame quality of the first video frame being higher than a video frame quality of the second video frame; compressing the first video frame to obtain a compressed first video frame; synthesizing the compressed first video frame with the second video frame, to generate a synthesized video frame; and transmitting the synthesized video frame to the at least two clients, the synthesized video frames being used for display by the at least two clients.

Embodiments of the disclosure provide an electronic device. The electronic device can include: a memory storing a set of instructions; and one or more processors configured to execute the set of instructions to cause the device to perform: receiving video frames sent by at least two clients participating in a video conference; the video frames comprising a first video frame and a second video frame, an video frame quality of the first video frame being higher than a video frame quality of the second video frame; compressing the first video frame to obtain a compressed first video frame; synthesizing the compressed first video frame with the second video frame, to generate a synthesized video frame; and transmitting the synthesized video frame to the at least two clients, the synthesized video frames being used for display by the at least two clients.

Embodiments of the disclosure provide a non-transitory computer readable medium storing a set of instructions that is executable by one or more processors of an apparatus to cause the apparatus to execute an image synthesis method. The method can include: receiving video frames sent by at least two clients participating in a video conference; the video frames comprising a first video frame and a second video frame, an video frame quality of the first video frame being higher than a video frame quality of the second video frame; compressing the first video frame to obtain a compressed first video frame; synthesizing the compressed first video frame with the second video frame, to generate a synthesized video frame; and transmitting the synthesized video frame to the at least two clients, the synthesized video frames being used for display by the at least two clients.

BRIEF DESCRIPTION OF THE DRAWINGS

Embodiments and various aspects of the present disclosure are illustrated in the following detailed description and the accompanying figures. Various features shown in the figures are not drawn to scale. Identical reference numerals generally represent identical components in the exemplary implementations of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference. "Images", "frames", and "frames of images" are used herein interchangeably, and they all refer to digital images.

The embodiments of the present disclosure have the following beneficial effects. When at least two frames of images are acquired, they are further divided into two types based on the image quality and the first type is higher. The first type of image is then compressed to reduce the image quality. As a result, the image quality of the compressed first type of image can be closer to the image quality of the second type of image compared to the original first type image. The compression result of the first type of image is synthesized with the second type of image and it is conducive to improving a harmonious degree of the synthesized image, so that the synthesized image is natural and not abrupt.

Exemplary embodiments are described in detail herein, and examples of the exemplary embodiments are shown in accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of the present disclosure. On the contrary, the implementations are merely examples of an apparatus and a method consistent with some aspects of the present disclosure described in detail in claims.

It should be noted that: in other embodiments, the steps of corresponding methods are not necessarily performed according to a sequence shown and described in the present disclosure. In some other embodiments, the methods may include more or fewer steps than those described in the present disclosure. In addition, a single step described in the present disclosure may be divided into a plurality of steps for description in other embodiments; and a plurality of steps described in the present disclosure may also be combined into a single step for description in other embodiments.

Figure 1:
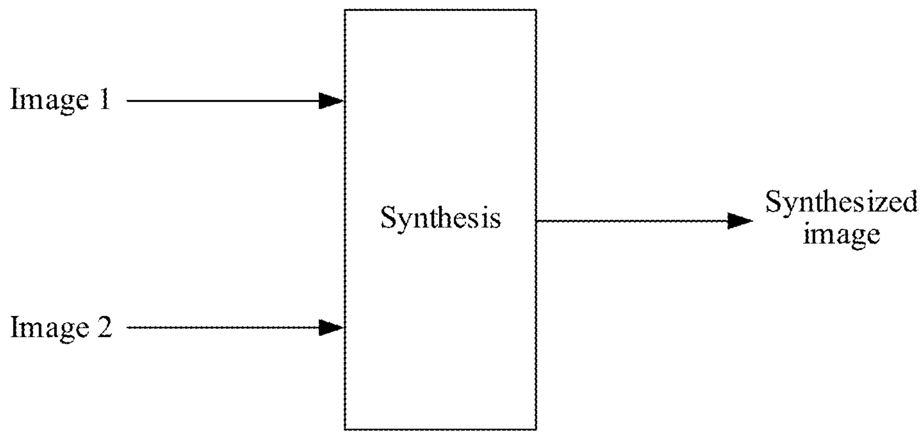
FIG. 1 is a flowchart of synthesizing two frames of images in the related art.

An image synthesis technique in the related art refers to extracting at least a part of an image area from each of at least two frames of images for synthesis, to obtain a synthesized image. For example, FIG. 1 shows a situation where two frames of images are synthesized. However, the image quality of different frames of images can be different, resulting in different qualities in different areas of the synthesized image, which presents a relatively abrupt and disharmonious visual effect.

Here, a situation that two frames of images are synthesized is used for exemplary illustration. In order to protect privacy or provide more immersion and enjoyment, image fusion based on a virtual background is widely used. In scenarios such as video conferences, video calls or live broadcast platforms, the portrait in a foreground video collected by a shooting apparatus may be synthesized with the virtual background to generate a synthesized video, that is, one frame in the two frames of images in FIG. 1 may be any video frame in the foreground video, and the other frame may be a preset virtual background. Specifically, a portrait matting method is used to process each video frame in the foreground video to obtain a blended portrait of each video frame, and the blended portrait is used for extracting the portrait inputted to the foreground video. At the same time, the position information is obtained through estimation of the portrait's position in the virtual background, for example, the position can be selected by a user in the virtual background. For each video frame in the foreground video, each video frame and the virtual background are synthesized according to the blended portrait and position information to output the synthesized video. However, there can be one or more lossy compression during the process of collecting and outputting foreground video. Due to a compression distortion problem, the image quality of each video frame in the foreground video decreases, yet the virtual background does. As a result, the image quality of the foreground video collected by the shooting apparatus is different from that of the virtual background, resulting in a relatively abrupt and disharmonious visual effect in the synthesized image.

Of course, in practical applications, it is not limited to the synthesis between two frames of images but can also be the synthesis between more than two frames of images, for example, two or more frames of images are synthesized into a panoramic image. If there are differences in the image quality between the images, the synthesized panoramic image may present a relatively abrupt and disharmonious visual effect.

Exemplarily, in addition to the synthesis between the foreground video and the virtual background, it may further be the synthesis between the video frames of multiple videos in scenarios such as video conferences, video calls or live broadcast platforms. In the case of multiple parties participating, a back-end server needs to synthesize the multiple videos into one for being displayed in a user device. In one example, during a multi-party video conference, the back-end server needs to synthesize the multiple videos into one for being displayed in a plurality of user devices. If there are image quality differences between the video frames of the multiple videos, the synthesized video can present a relatively abrupt and disharmonious visual effect. In another example, in a multi-party microphone-connected live broadcast scenario, the back-end server needs to synthesize multiple live broadcast videos into one, so that audience clients entering the live broadcast room can see a picture that a plurality of hosts perform microphone-connected live broadcast. If there are image quality differences between the video frames of the multiple live broadcast videos, the synthesized video may present a relatively abrupt and disharmonious visual effect.

Figure 2A:
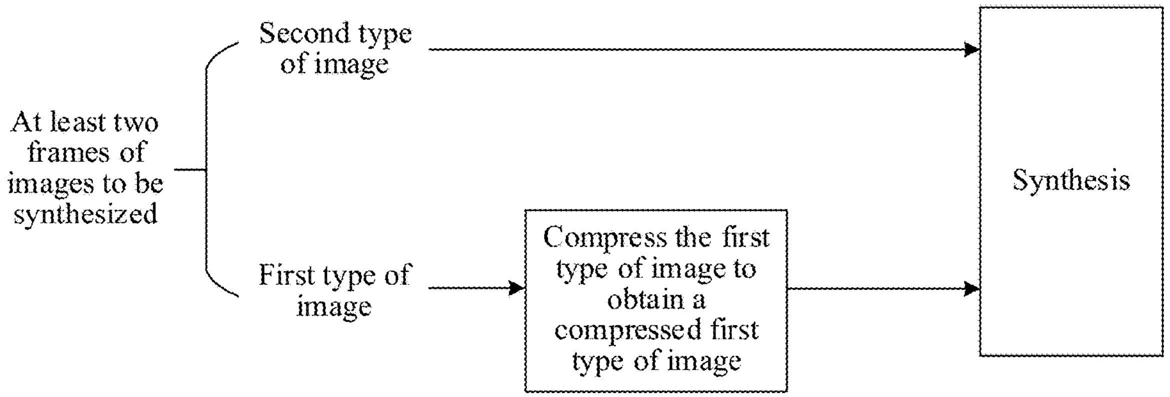
FIG. 2A is a schematic diagram of an exemplary image synthesis method, according to embodiments of the disclosure.

The present disclosure provides solutions aiming at the problems in the related art. FIG. 2A is a schematic diagram of an exemplary image synthesis method 200A, according to embodiments of the disclosure. As shown in FIG. 2A, the method 200A starts by acquiring the at least two frames of images that are divided into the first type of image and the second type of image according to image quality, and the image quality of the first type of image is higher. Then, the first type of image is compressed to reduce its image quality, so as to obtain the compressed first type of image, so that the image quality of the compressed first type of can be closer to the image quality of the second type of image compared to the original first type of image. The compressed first type of is synthesized with the second type of image, and it is conducive to improving a harmonious degree of the synthesized image, so that the synthesized image is natural and not abrupt.

The image synthesis method provided by the embodiment of the present disclosure can be executed by an electronic device. The electronic device includes, but not limited to a server, a personal computer, a laptop computer, a cellular phone, a camera phone, a smartphone, a personal digital assistant, a media player, a navigation device, an email transceiver device, a game console, a tablet computer, a wearable device or a combination of any devices of these devices.

Exemplarily, the electronic device may be integrated with a computer program product, and the computer program product, when executed by a processor in the electronic device, is used for implementing the image synthesis method provided by the embodiment of the present disclosure.

Figure 2B:
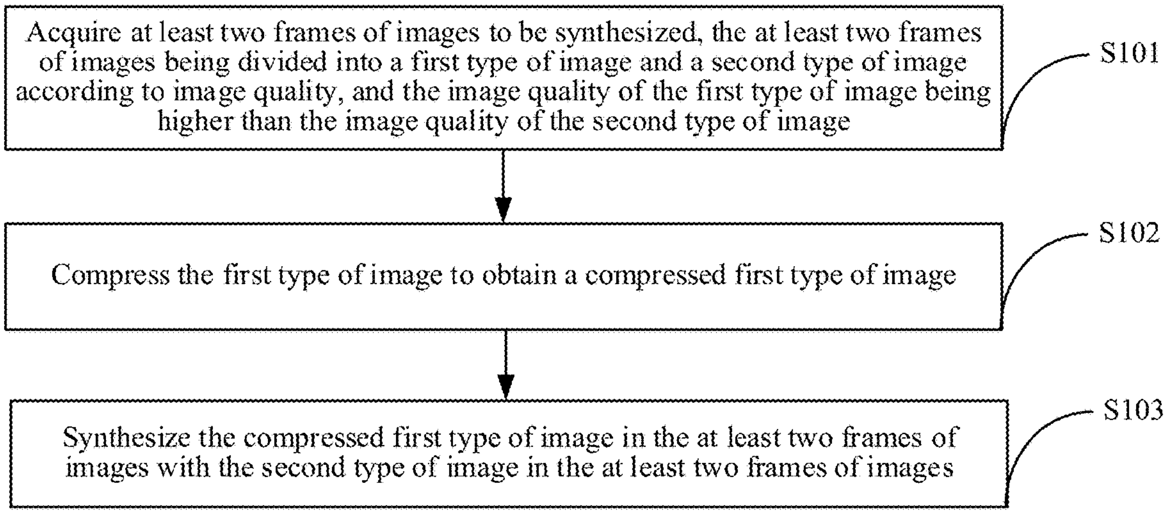
FIG. 2B is a flowchart of an exemplary image synthesis method, according to embodiments of the disclosure.

FIG. 2B is a flowchart of an exemplary image synthesis method 200B, according to embodiments of the disclosure. The method may be executed by the electronic device. As shown in FIG. 2B, the method 200B includes the following steps S101-S103.

In step S101, at least two frames of images to be synthesized are acquired; and the acquired images are divided into a first type of image and a second type of image according to image quality where the image quality of the first type of image is higher than the image quality of the second type of image.

In step S102, the first type of image is compressed to obtain a compressed first type of image.

In step S103, the compressed first type of image in the at least two frames of images is synthesized with the second type of image in the at least two frames of images.

It may be understood that this embodiment has no limitation to the source of the at least two frames of images to be synthesized, which may be specifically selected according to actual application scenarios.

In some embodiments, the second type of image in the at least two frames of images is an image that has undergone lossy compression processing; and the first type of image in the at least two frames of images does not undergo lossy compression processing, or the number of times lossy compression processing performed on the first type of image is less than it performed on the second type of image. Therefore, there are image quality differences in the at least two frames of images.

In some embodiments, one frame in the at least two frames of images is a foreground video frame sent by a client participating in a video conference, and the other frame is a preset background image; and the electronic device needs to synthesize foreground portrait in the foreground video frame with the background image. Since the foreground video frame sent by the client needs to undergo lossy compression processing, image quality of the foreground video frame is lower than image quality of the background image. Therefore, the background image needs to be compressed through step S102 firstly to reduce the image quality of the background image, so as to perform synthesis.

In some embodiments, the at least two frames of images are video frames sent by at least two clients participating in a video conference respectively. The electronic device needs to synthesize the video frames sent by the at least two clients respectively into one video frame and send it to each client participating in the video conference to be displayed In such way, users participating in the video conference can see pictures of all people. Network environments of at least two clients are different, so that degrees of lossy compression of the video frames sent by the at least two clients respectively are also different, resulting in image quality differences between the at least two frames of images. Therefore, the type of video frame with low image quality needs to be compressed through step S102 firstly, so as to perform synthesis.

In some embodiments, the at least two frames of images are video frames sent by at least two live broadcast clients participating in microphone-connected host. The electronic device needs to synthesize the video frames sent by the at least two host clients individually into one video frame and send it to all clients in the same live broadcast room. In such way, the audience clients and the host client of this live broadcast room may all see a picture that a plurality of hosts perform microphone-connected live broadcast. Network environments of at least two host clients are different, so that degrees of lossy compression of the video frames sent by the at least two host clients respectively are also different, resulting in image quality differences between the at least two frames of images. Therefore, the type of video frame with low image quality needs to be compressed through step S102 firstly, so as to perform synthesis.

In some embodiments, a compression parameter can be preset according to the actual application scenarios. The first type of image is compressed by using the preset compression parameter to reduce the image quality of the first type of image, so as to obtain the compressed first type of image. The image quality of the compressed first type of image can closer to the image quality of the second type of image compared to the original first type of image. Hence, it is conducive to improving a harmonious degree of a synthesized result, so that the synthesized result is natural and not abrupt.

In some embodiments, where the image quality may differ but is not significantly different, and human eye resolution can already meet certain image harmony standards, a compression parameter can be determined using the image quality of the second type of image. The image harmonization condition indicates that a difference between the image quality of the compressed first type of image and the image quality of the second type of image is not greater than a preset difference. The preset difference can be specifically set according to the actual application scenarios. Then, the compression parameter is used to compress the first type of image, the image quality of the first type of image is reduced to a certain extent, so that the image quality of the compressed first type of image is closer to the image quality of the second type of image. It is conducive to improving the harmonious degree of the synthesized result, so that the synthesized result is natural and not abrupt.

In some embodiments, as for any first type of image in the at least two images, the first type of image can be compressed with a goal of reducing the image quality to meet the image quality of the second type of image. Hence, the image quality of the compressed first type of image is basically the same as the image quality of the second type of image, further improving the harmonious degree of the synthesized result.

In some embodiments, the electronic device may determine the image qualities corresponding to the at least two frames of images respectively, and then the at least two frames of images are divided into a first type of image and a second type of image according to the image quality. For example, an image with a lower image quality is determined as the second type of image, an image with a higher image quality is determined as the first type of image. In other words, the image quality of the first type of image is higher than the image quality of the second type of image. That is to say, the first type of image is an image that needs to reduce the image quality, and the second type of image is an image that does not need to reduce the image quality.

In some embodiments, if there are 3 frames of images to be synthesized, the frame with the lowest image quality can be determined as the second type of image, and the rest as the first type of images. Exemplarily, if there are 10 frames of images to be synthesized, the image qualities may be sorted from high to low, the lowest 3 frames can be determined as the second type of images, and the rest as the first type of images. This embodiment has no limitation to the number of divisions between the first images and the second images.

It may be understood that the image quality reflects the richness of image information of one frame of image, the higher the image quality, the richer the image information, and vice versa. The image information includes, but not limited to texture information, color information, shape information, gradient information, spatial relationship information and the like.

In some embodiments, the image qualities corresponding to the at least two frames of images respectively can be determined based on quality evaluation information from users for image content. For example, the quality of each frame of image is scored by the users, and the lower the score, the lower the image quality.

In some embodiments, the image qualities corresponding to the at least two frames of images respectively can be determined based on a difference between the image and a reference image, and the larger the difference, the lower the image quality.

In some embodiments, the electronic device can process any image in the at least two frames of image acquired based on a pre-trained image quality evaluation model to obtain image quality. This process aims to reduce user operations and can further improve the accuracy of image quality. Exemplarily, the image quality evaluation model is used for performing feature extraction on an inputted image and predict extracted features to output a predicted result. The predicted result includes a quality matrix of the inputted image, the number of entries in the quality matrix is the same as the number of pixels in the inputted image, and the two are in one-to-one correspondence. The numerical values in the quality matrix are used to indicate the degree of loss of pixel values of the corresponding pixels in the inputted image.

In one example, the smaller the entry in the quality matrix is, the greater the corresponding pixel's loss degree it indicates in the input image, and vice versa. Of course, it is also possible that the greater entry in the quality matrix, indicating the greater loss degree of the corresponding pixel in the input image. This embodiment has no limitation to this.

The image quality evaluation model is obtained through supervised learning using a first training sample set, and each training sample of the first training sample set includes a distorted image and a quality matrix label. The distorted image is obtained by reducing image quality of a first training image, and the quality matrix label of the distorted image is determined according to a difference between the first training image and the distorted image.

In some embodiments, algorithms such as structural similarity (SSIM), peak signal to noise ratio (PSNR) and/or learned perceptual image patch similarity (LPIPS) can be adopted to measure a difference between the first training image and the distorted image to determine the quality matrix label.

Supervised learning is a machine learning task that infers functions from a labeled training data set. Samples with a certain or some known characteristics are used as the training set to establish a mathematical model, such as a discriminant model in pattern recognition, and a weight model in an artificial neural network method. Then the established model is used to predict unknown samples.

Here, a training process of the image quality evaluation model is exemplarily illustrated. For the first training sample set, the following process is executed in a looping mode until a loop end condition is met. The current image quality evaluation model is used to obtain a predicted quality matrix of each frame of distorted image in the training sample set. When the loop end condition is not met, one or more model parameter(s) of the current image quality evaluation model is/are adjusted according to the predicted quality matrix of each frame of distorted image and a real quality matrix label The adjusted current image quality evaluation model is used as a current image quality evaluation model in a next loop process. The loop end condition includes, reaching a preset number of loops, or a difference between the predicted quality matrix of each frame of distorted image and the real quality matrix label being smaller than the preset difference but are not limited to this.

Exemplarily, in a training process, the electronic device can calculate a loss function according to the predicted quality matrix of each frame of distorted image and the real quality matrix label. This aims to inversely adjust the model parameter of the current image quality evaluation model according to a calculated loss value. The loss function includes, but not limited to a mean square error loss function, a cross entropy loss function, a mean absolute error loss function or the like, and this embodiment has no limitation to this.

The training process of the image quality evaluation model and the above image synthesis process (step S101 to step S103) can be executed by the same electronic device; or, based on actual business division requirements, they can also be executed by different electronic devices, and this embodiment has no limitation to this. For example, the training process of the image quality evaluation model can be executed by a first electronic device, the above image synthesis process (step S101 to step S103) can be executed by a second electronic device. After the image quality evaluation model is trained by the first electronic device, the image quality evaluation model can be transplanted into the second electronic device.

Exemplarily, it is considered that there may be differences in sizes of the inputted images. In order to avoid changes in image scale from affecting a final predicted result, a target size of an image inputted to the image quality evaluation model may be preset. For example, in the above training process, if the size of the distorted image is greater than the target size, the distorted image can be partitioned to obtain at least two frames of images that meet the target size. Use them as input of current image quality evaluation model to obtain the predicted quality matrixes corresponding to the partitioned frames of images, and synthesize the predicted quality matrixes to obtain a predicted quality matrix of the distorted image. If the size of the distorted image is smaller than the target size, a padding operation can be performed. The padding method is performed on an edge of the distorted image to obtain input image that meet the target size. This aims to extract the predicted quality matrix of the distorted image from predicted quality matrixes of input images and outputted by the current image quality evaluation model.

In one example, for example, the target size is 128*128, and if the distorted image is 256*256, the distorted image may be divided into 4 image blocks of 128*128 without overlapping. If the distorted image is 64*64, a mirror padding operation may be performed on the distorted image, for example, pixels with pixel values of 0 are supplemented at an image edge of the distorted image to obtain an inputted image of 128*128.

The embodiment of the present disclosure has no limitation to a specific structure of the image quality evaluation model, which may be specifically set according to actual application scenarios. The structure of the image quality evaluation model can be a convolutional neural network structure, a long-short term memory (LSMT) structure, a transformer structure, a U-net model structure or the like.

Figure 3:
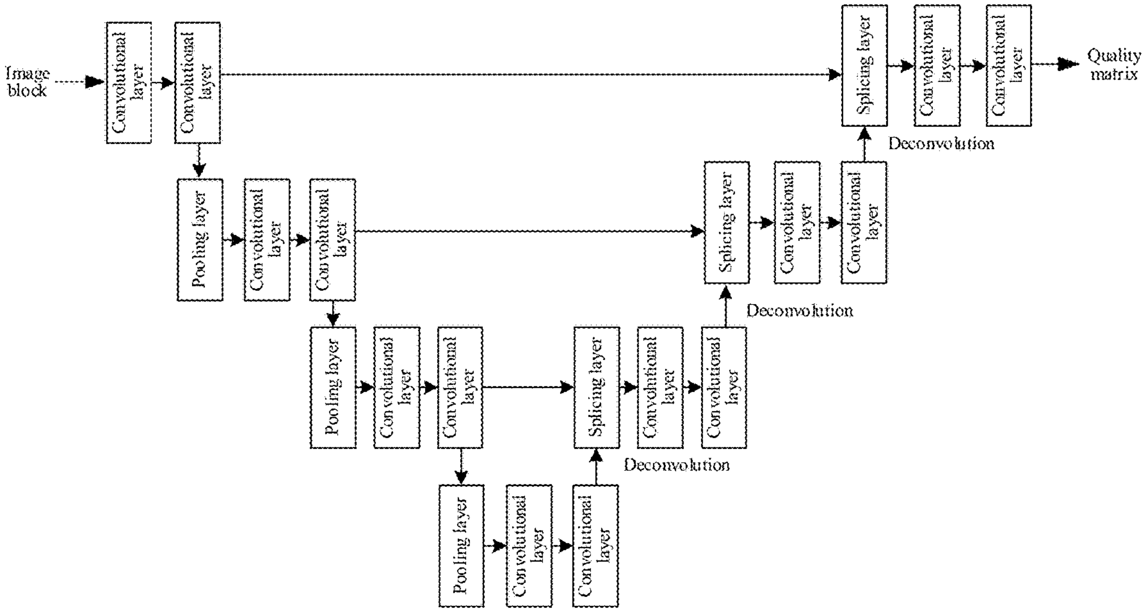
FIG. 3 is a schematic structural diagram of an exemplary U-net model, according to embodiments of the disclosure.

FIG. 3 is a schematic structural diagram of an exemplary U-net model, according to embodiments of the disclosure. As shown in FIG. 3, taking a U-net model with a target size of 128*128 as an example, the input image is first divided into image blocks with a size of 128*128 to be inputted to the U-net model. Then, the U-net model estimates the predicted quality matrix of each image block, and finally the predicted quality matrixes of all image blocks are combined into the predicted quality matrix of the inputted image. The U-net model is an encoding-decoding structure. A compression channel is an encoder used for extracting features of the inputted image layer by layer. A compression channel has a structure of two convolutional layers and one pooling layer repeatedly adopted, and the dimensionality of a feature map increases by one time after each pooling operation. An extended channel is a decoder used for restoring position information of the inputted image. First, one deconvolution operation is performed to halve the dimensionality of the feature map, then feature maps obtained by cropping the corresponding compression channel are spliced to form a feature map with a double size. Then, feature extraction is performed by using two convolutional layers, and the structure is repeated. Each hidden layer of the U-net model has a higher feature dimensionality, which is beneficial for the model to learn more diverse and comprehensive features. The "U-shaped" structure of the U-net model makes a cropping and splicing process more intuitive and reasonable. The splicing of a high-layer feature map and a low-layer feature map, as well as the repeated and continuous operation of convolution, enables the model to obtain a more accurate outputted feature map by combining contextual and detailed information. In some embodiments, the electronic device inputs the at least two frames of images to be synthesized to the image quality evaluation model to obtain the quality matrixes corresponding to the inputted images respectively.

Exemplarily, the electronic device may divide the at least two frames of images into a first type and a second type according to the quality matrixes where the image quality of the first type of image is higher t. Then, statistical analysis is performed on the quality matrix of the second type of image in the at least two frames of images to determine a quality characteristic value of the second type of image. In one example, the number of entries in the quality matrix of the image is the same as the number of pixels in the image, and the two are in one-to-one correspondence. The entry in the quality matrix are used for indicating corresponding pixel's loss degree in the image. The quality characteristic value of the second type of image can include but not limited to: a statistic value of the entry in the quality matrix of the second type of image in the at least two frames of images. The statistic value includes, but not limited to an average value, a median, a maximum value, a weighted sum value of the median and the maximum value, any value between the median and the maximum value or the like, and this embodiment has no limitation to this.

In some exemplary embodiments, one implementation for reducing the image quality is to perform lossy compression processing on the image. After acquiring the quality characteristic value of the second type of image, the electronic device, as for any first type of image in the at least two frames of images, compresses the first type of image with a goal of reducing the image quality to meet the quality characteristic value. The image quality of a compression result of the first type of image can be closer to the image quality of the second type of image. Exemplarily, as for any first type of image in the at least two frames of images, the electronic device can determine a compression parameter of the first type of image according to the image itself and the quality characteristic value. Then the electronic device compress the first type of image by using a preset compression algorithm and the compression parameter.

In one example, it is considered that the step of an image compression process that can cause loss of image information is usually a quantization step, and other compression steps usually do not cause loss of image information. The compression parameter may include a quantization parameter (QP) or a quantization matrix. Exemplarily, the image information can indicate pixel values, gradient information and/or texture information and the like of pixels in the image, which is not limited in this embodiment.

As for any two frames of first type of images, if the image quality of one frame of first type of image is higher, it reflects that the image information of the first type of image is more, Using the same compression algorithm and the same compression parameter for compression will lose more image information for the first type of image. Under the same condition of the goal of reducing the image quality to meet the quality characteristic value, if the image qualities of any two frames of first type of images are different, then the compression parameters of the two frames of first type of images are different.

Therefore, as for any first type of image, suitable compression parameters can be determined according to the image quality of the first type of image and the quality characteristic value of the second type of image. This aims to further improve the harmonious degree of a final synthesized result. A decline degree of the image quality indicated by the compression parameter is positively correlated with the quality characteristic value of the second type of image. In other words, the larger the quality characteristic value represents the higher the degree of loss of the image information, and the higher the decline degree of the image quality indicated by the final determined compression parameter, and vice versa. The decline degree of the image quality indicated by the compression parameter is negatively correlated with the image quality of the first type of image. The higher image quality of the first type of image represents the richer image information of the first type of image, and the lower decline degree of the image quality indicated by the compression parameter of the first type of image, and vice versa.

In some embodiments, a mapping relationship with the image quality and the quality characteristic value as independent variables and the compression parameter as a dependent variable may be predetermined. Then in an actual, the compression parameter of the first type of image can be determined according to the image quality of the first type of image, the quality characteristic value and the mapping relationship.

In some embodiments, a compression parameter estimation model may be pre-trained to learn relationships between the image quality and the compression parameter, as well as the quality characteristic value and the compression parameter. As for any first type of image in the at least two frames of images, the electronic device can process the first type of image and the quality characteristic value by using the pre-trained compression parameter estimation model to obtain the compression parameter.

The compression parameter estimation model is obtained through supervised learning using a second training set. Each training sample in the second training sample set includes a second training image, a compression parameter label and a quality characteristic value determined according to the second training image and the compression parameter label. When determining the quality characteristic value in any training sample, the electronic device may compress a second training image in that training sample by using a preset compression algorithm and the compression parameter label in the training sample. A quality matrix can be determined through the difference between a compression result of the second training image and the second training image, and quality characteristic value can be obtained through the statistical analysis of the quality matrix.

Here, a training process of the compression parameter estimation model is exemplarily illustrated. As for the second training sample set, the following process is executed in a looping mode until a loop end condition is met. The current compression parameter evaluation model is used to obtain a compression parameter prediction result for reducing the image quality of each second training image in the training set to meet the quality characteristic value. When the loop end condition is not met, one or more model parameter(s) of the current compression parameter estimation model is/are adjusted according to the compression parameter prediction result a real compression parameter label. The adjusted current compression parameter estimation model is used as a current compression parameter estimation model in a next loop process. The loop end condition includes, but not limited to reaching a preset number of loops, or a difference between the compression parameter prediction result required by each frame of second training image and the real compression parameter label being smaller than the preset difference.

In some embodiments, the electronic device can calculate a loss function according to the compression parameter prediction result for reducing the image quality of each frame of second training image to meet the quality characteristic value and the preset compression parameter. The electronic device can inversely adjust the model parameter of the current compression parameter estimation model according to a calculated loss value. The loss function includes, but not limited to a mean square error loss function, a cross entropy loss function, a mean absolute error loss function or the like, and this embodiment has no limitation to this.

The first training image in the training process of the compression parameter estimation model and the second training image in the training process of the image quality evaluation model can be different, partially the same, or completely the same, and this embodiment has no limitation to this. The training process of the compression parameter estimation model and the above image synthesis process (step S101 to step S103) can be executed by the same electronic device or different electronic devices, based on actual business division requirements, and this embodiment has no limitation to this.

The embodiment of the present disclosure has no limitation to a specific structure of a model of a preset structure, which can be specifically set according to actual application scenarios. The structure of the compression parameter estimation model may be a convolutional neural network, a LSMT network, a transformer model or the like.

Figure 4:
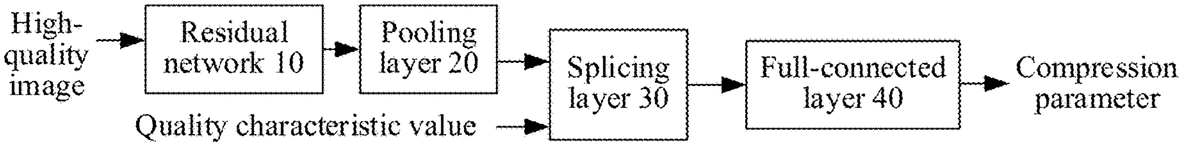
FIG. 4 is a schematic diagram of an exemplary compression parameter estimation model, according to embodiments of the disclosure.

FIG. 4 is a schematic diagram of an exemplary compression parameter estimation model, according to embodiments of the disclosure. As shown in FIG. 4, the compression parameter estimation model can include a residual network 10, a pooling layer 20, a splicing layer 30 and at least one full-connected layer 40. The residual network 10 is used for extracting image features from a first type of image. Exemplarily, the residual network 10 includes an addition layer and at least one convolutional layer. The convolutional layer is used for performing feature extraction on the first type of image, and the addition layer is used for adding features outputted by the convolutional layer to the first type of image and outputting the image features. The pooling layer 20 is used for performing dimensionality reduction processing on the image features outputted by the residual network. The splicing layer 30 is used for splicing the quality characteristic value with the image features after dimensionality reduction processing outputted by the pooling layer 20 to obtain splicing features. The full-connected layer 40 is used for predicting a compression parameter of the first type of image according to the splicing features outputted by the splicing layer 30.

In some embodiments, the electronic device can first determine the compression parameter for reducing the image quality of the first type of image in the at least two frames of images to the quality characteristic value. It can then compress the first type of image by using the compression parameter. After compressing all first type of images in the at least two frames of images, the electronic device may synthesize a compression result of the first type of image with the second type of image in the at least two frames of images. It is conducive to improving a harmonious degree of a synthesized result, so that the synthesized result is natural and not abrupt.

Figure 5A:
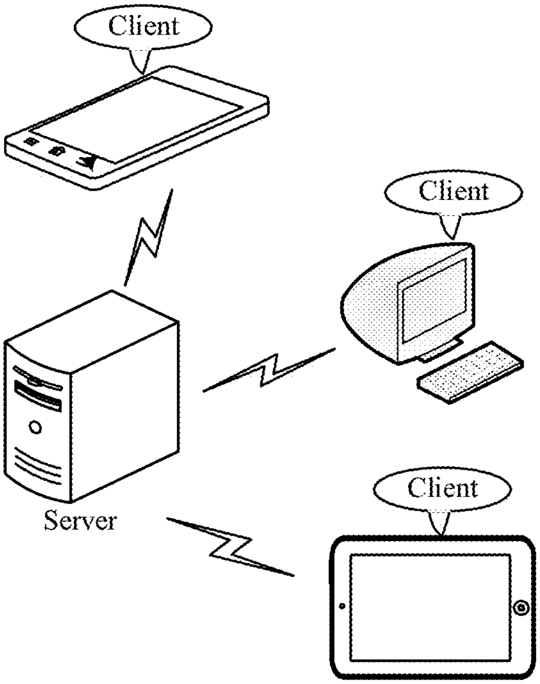
FIG. 5A is a schematic diagram of an exemplary video conference system, according to embodiments of the disclosure.

In some embodiments, the image synthesis method provided by the embodiment of the present disclosure can be applied to a video conference scenario. FIG. 5A is a schematic diagram of an exemplary video conference system 500A, according to embodiments of the disclosure. As shown in FIG. 5A, the video conference system 500A includes a client and a server, the client is an application that can achieve online conferences, the client may be installed in devices to which different users belong, and the devices include, but not limited to a mobile phone, a computer, a tablet, a watch, a bracelet or the like. Exemplarily, a user may log in to the client through a personal exclusive account with a unique identification function. The server may be a physical server or a cloud server, and this embodiment has no limitation to this. The server is used for providing back-end services of the client, such as back-end services of the video conference.

In one example, when a user A, a user B and a user C participate in the same video conference through the software clients installed on the devices, the server is responsible for processing and forwarding relevant content in the video conference. For example, when the user A enables a virtual background replacement function, the server needs to synthesize a foreground target (such as a portrait of the user A) in a foreground video frame uploaded by the client of the user A with a virtual background. The server then return a synthesized video after synthesis to the client of the user A, the client of the user B and the client of the user C. For another example, in order to make each client display pictures of the user A, the user B and the user C at the same time, the server needs to synthesize three videos. Those videos are uploaded by the software client of the user A, user B and user C, synthesized into one video, and further distributed to the software client of the user A, user B and user C.

Figure 5B:
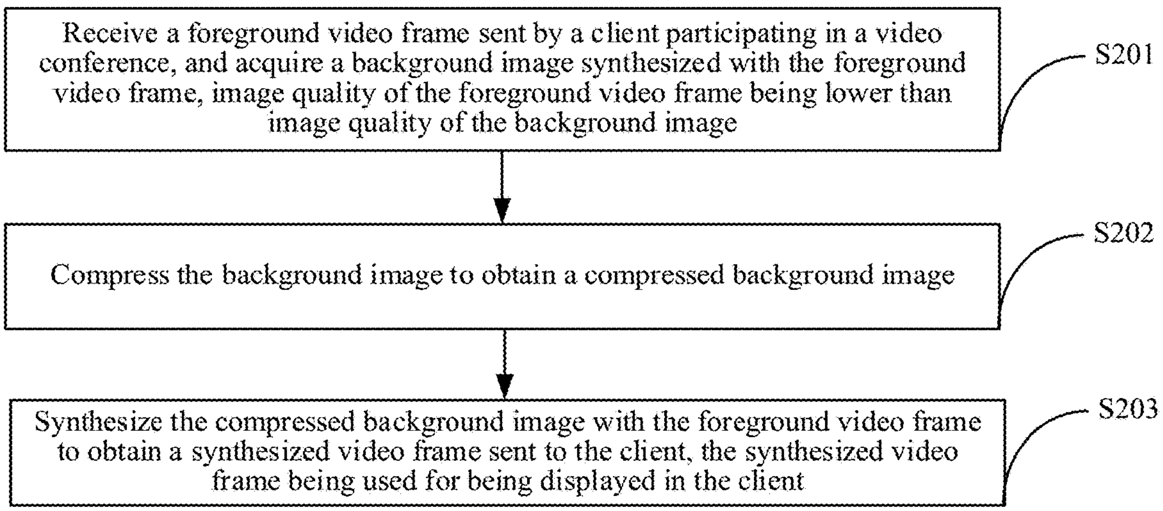
FIG. 5B is a flowchart of an exemplary video conference method, according to embodiments of the disclosure.

FIG. 5B is a flowchart of an exemplary video conference method 500B, according to embodiments of the disclosure. For example, the method 500B can be used to meet the demand of the user for replacing the background, As shown in FIG. 5B, the video conference method 500B includes the following steps S201-S203.

In step S201, a foreground video frame sent by a software client participating in a video conference is received, and a background image synthesized with the foreground video frame is acquired. Image quality of the foreground video frame is lower than image quality of the background image.

In step S202, the background image is compressed to obtain a compressed background image.

In step S203, the compressed background image is synthesized with the foreground video frame to obtain a synthesized video frame sent to the client. The synthesized video frame is used for being displayed in the client.

In some embodiments, in scenarios such as video conferences, video calls or live broadcast platforms, it is considered that the foreground video frame undergoes one or more compressions, resulting in a decrease in the image quality. The background image undergoes compression, resulting in a higher image quality. In order to improve a harmonious degree of their synthesis, the background image may be compressed, so that the image quality of the compressed background image can be closer to the image quality of the foreground video frame. The compressed background image is synthesized with the foreground video frame, which is conducive to improving the harmonious degree of a synthesized result and improving a display effect.

In some embodiments, a compression parameter can be preset according to actual application scenarios, and the background image is compressed by using the compression parameter.

In some embodiments, a compression parameter that meets an image harmonization condition can be determined according to the image quality of the foreground video frame, and the background image is compressed by using the compression parameter. The image harmonization condition indicates that a difference between the image quality of the compressed background image and the image quality of the foreground video frame is not greater than a present difference.

In some embodiments, the background image can be compressed with a goal of reducing the image quality so that the image quality of the compressed background image is roughly the same as the image quality of the foreground video frame.

Figure 5C:
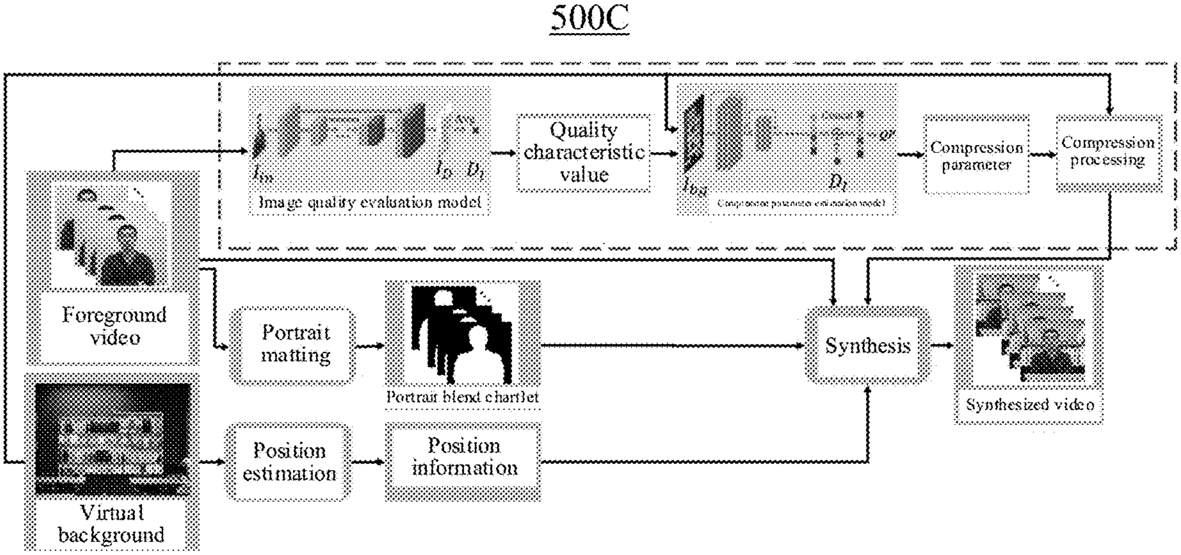
FIG. 5C is a flowchart of synthesizing a foreground video with a virtual background, according to embodiments of the disclosure.

As shown in FIG. 5C, in one example, after applying the image synthesis method mentioned in the embodiment of the present disclosure, a portrait matting method 500C is used to process each video frame in the foreground video to obtain a blended portrait of each video frame. The blended portrait is used for extracting the portrait inputted to the foreground video. At the same time, a position of the portrait in the virtual background is estimated to obtain position information, for example, the position can be selected by a user in the virtual background. As for each video frame in the foreground video, the video frame $I_{in}$ is inputted to a pre-trained image quality evaluation model to obtain a quality matrix $I_D$, so that statistic processing is performed on entries in the quality matrix to obtain a quality characteristic value $D_I$ of the video frame. Then, the quality characteristic value of the video frame and a virtual background $I_{bg}$ are inputted to a pre-trained compression parameter estimation model to obtain a compression parameter QP, and the virtual background is compressed by using the compression parameter. If a compression result of the virtual background is different from a format of the video frame of the foreground video, further format conversion needs to be performed on the compression result of the virtual background, so that the synthesized two sides are the same in format.

Figure 6A:
FIG. 6A is a schematic diagram of an effect of synthesizing two frames of images in the related art.
Figure 6B:
FIG. 6B is a schematic diagram of an effect of synthesizing two frames of images, according to embodiments of the disclosure.

Then, as for any video frame in the foreground video, the video frame is synthesized with the compression result of the virtual background according to the blended portrait corresponding to the video frame and the position information to output a synthesized video. FIG. 6A and FIG. 6B illustrate the difference between the images synthesized by the convention methods (FIG. 1) and the disclosed methods (FIG. 5C). Specifically, FIG. 6A shows a synthesized image obtained from a processing flow of FIG. 1. The portrait in the synthesized image is relatively blurry, while the background is relatively clear, which is abrupt and disharmonious when combined. FIG. 6B shows a synthesized image obtained from a processing flow of FIG. 5C. Since the virtual background also undergoes lossy compression processing, the presentation effects of the portrait and background in the synthesized image are closer, and the synthesized image is more harmonious.

The specific implementations of this embodiment specifically refer to implementation processes of corresponding steps in the above method, which will not be repeated here.

Figure 7:
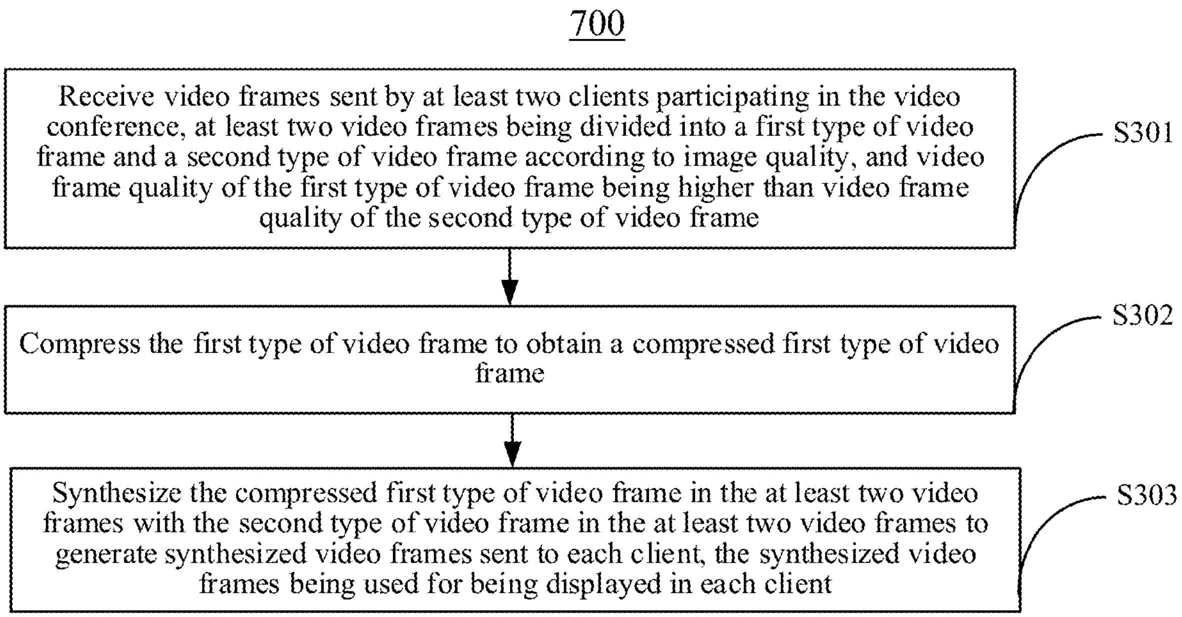
FIG. 7 is a flowchart of another video conference method, according to embodiments of the disclosure.

FIG. 7 is a flowchart of a video conference method 700, according to embodiments of the disclosure. For example, the method 700 can be used for a scenario of synthesizing multiple videos in a video conference. The method may be executed by a server, and As shown in FIG. 7, the method 700 includes the following steps S301-S303.

In step S301, video frames sent by at least two clients participating in the video conference are received. At least two video frames are divided into a first type of video frame and a second type of video frame according to image quality, and video frame quality of the first type of video frame is higher than video frame quality of the second type of video frame.

In step S302, as for any first type of video frame in the at least two video frames, the first type of video frame is compressed with a goal of reducing image quality to meet image quality of the second type of video frame.

In step S303, a compression result of the first type of video frame in the at least two video frames is synthesized with the second type of video frame in the at least two video frames to generate synthesized video frames sent to each client. The synthesized video frames are used for being displayed in each client.

In some embodiments, as for the scenario of synthesizing multiple videos in the video conference, it is considered that there are differences between image qualities of the video frames of each video. Hence, after receiving the video frames sent by the at least two clients participating in the video conference, the server divides them into a first type of video frame and a second type of video frame according to image quality. Then, the first type of video frame is compressed, so that the image quality of the compressed first type of video frame can be closer to the image quality of the foreground video frame, the compressed first type of video frame is synthesized with the second type of video frame. This is conducive to improving a harmonious degree of a synthesized result, so that the synthesized result is natural and not abrupt, and the display effect is improved.

In some embodiments, a compression parameter may be preset according to actual application scenarios, and the first type of video frame is compressed by using the compression parameter.

In some embodiments, a compression parameter that meets an image harmonization condition can be determined according to the image quality of the second type of video frame, and the first type of video frame is compressed by using the compression parameter. The image harmonization condition indicates that a difference between the image quality of the compressed first type of video frame and the image quality of the second type of video frame is not greater than a present difference.

In some embodiments, the first type of video frame can be compressed with a goal of reducing the image quality to meet the image quality of the second type of video frame, so that the image quality of the compressed first type of video frame is basically the same as the image quality of the second type of video frame.

The specific implementations of this embodiment specifically refer to implementation processes of corresponding steps in the above method, which will not be repeated here.

Figure 8:
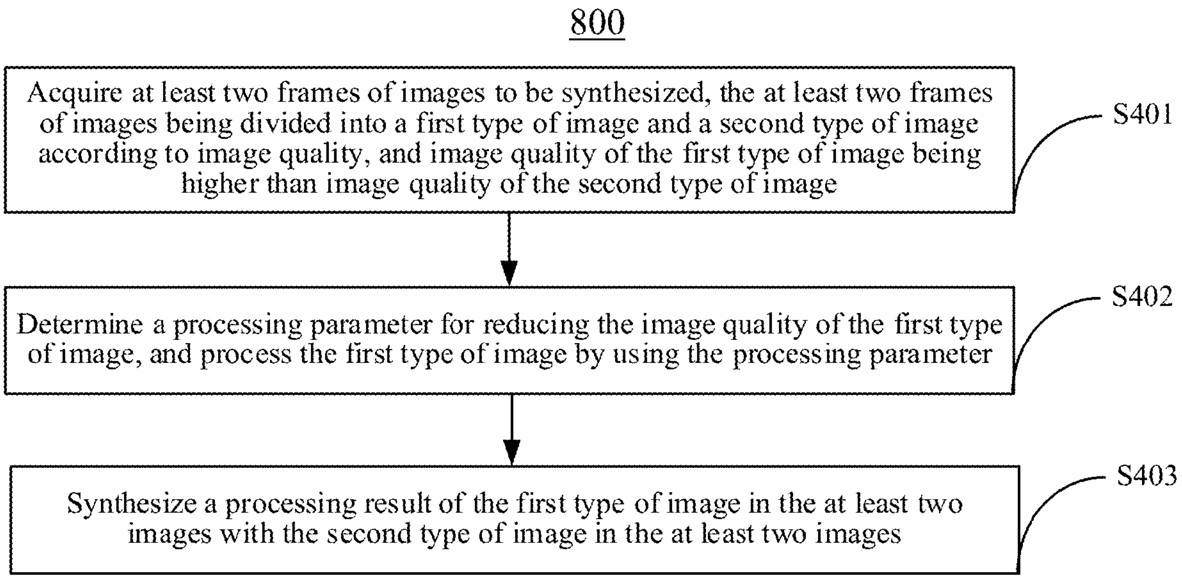
FIG. 8 is a flowchart of another image synthesis method, according to embodiments of the disclosure.

In some embodiments, it is considered that imaging processing of reducing the high-quality images is not limited to compressing them, other processing methods may also be used, for example, blur processing is performed on the high-quality images by using a preset blur algorithm. FIG. 8 is a flowchart of another image synthesis method 800, according to embodiments of the disclosure. As shown in FIG. 8, the method 800 includes the following steps S401-S403.

In step S401, at least two frames of images to be synthesized are acquired; and the acquired images are divided into a first type of image and a second type of image according to image quality where the image quality of the first type of image is higher.

In step S402, a processing parameter for reducing the image quality of the first type of image is determined, and the first type of image is processed by using the processing parameter.

In step S403, a processing result of the first type of image in the at least two images is synthesized with the second type of image in the at least two images.

In this embodiment, the processing parameter for reducing the image quality of the first type of image is determined, and the first type of image is processed by using the processing parameter. Thus, the image quality of a processing result of the first type of image can be closer to the image quality of the second type of image compared to the original first type of image. The processing result of the first type of image in the at least two images is synthesized with the second type of image in the at least two images, and it is conducive to improving the harmonious degree of the synthesized image, so that the synthesized image is natural and not abrupt.

In some embodiments, the processing parameter includes a blur parameter. Processing the first type of image by using the processing parameter, includes: performing blur processing on the first type of image by using the blur parameter. Exemplarily, the blur algorithm includes, but not limited to Gaussian blur, box blur, dual blur, bokeh blur, tilt shift blur, iris blur, grainy blur, radial blur, directional blur or the like.

In some embodiments, the processing parameter includes a compression parameter. Processing the first type of image by using the processing parameter, includes: the first type of image is compressed by using the compression parameter. Exemplarily, the lossy compression algorithm includes, but not limited to a joint photographic experts group (JPEG) compression algorithm, an H261 compression algorithm and/or a moving picture experts group (MPEG) compression algorithm and the like.

In some embodiments, the method further includes: statistical analysis is performed on the image quality of the second type of image in the at least two images to determine a quality characteristic value of the second type of image. The processing parameter is a processing parameter required for reducing the image quality of the first type of image to meet the quality characteristic value.

In some embodiments, the image quality of the images is represented by a quality matrix, and entries in the quality matrix are used for indicating the degree of loss of pixel values of corresponding pixels in the images. The quality characteristic value of the second type of image includes: a statistic value of the numerical values in the quality matrix of the second type of image in the at least two images, and the statistic value includes at least one of an average value, a median and a maximum value.

In some embodiments, the method further includes: as for any image in the at least two frames of images, the image is processed based on a pre-trained image quality evaluation model to obtain the image quality of the image. The image quality evaluation model is obtained through supervised learning using a first training sample set; each training sample of the first training sample set includes a distorted image and a quality matrix label; and the distorted image is obtained by reducing image quality of a first training image, and the quality matrix label of the distorted image is determined according to a difference between the first training image and the distorted image.

In some embodiments, there may be targeted processing algorithms considering different features of images in different fields. The required processing algorithm may be determined according to a field to which the first type of image belongs. For example, the processing algorithm of the images in a medical field is the Gaussian blur algorithm, and the processing algorithm of the images in a building field is radial blur, and the like. In one example, a mapping relationship between the fields and the processing algorithms can be pre-stored. In an image synthesis process, the required processing algorithm is determined according to the field to which the first type of image belongs and the pre-stored mapping relationship.

The processing parameter is determined according to the image quality of the first type of image and the quality characteristic value. Exemplarily, a decline degree of the image quality indicated by the processing parameter is negatively correlated with the image quality of the first type of image and is positively correlated with the quality characteristic value. Exemplarily, the processing parameter corresponding to the first type of image is obtained by inputting the first type of image and the quality characteristic value to the pre-trained processing parameter estimation model for processing. The processing parameter estimation model is obtained through supervised learning using a preset training set; and each training sample in the preset training set includes a training image, a processing parameter label and a quality characteristic value determined according to the training image and the processing parameter label.

Figure 9:
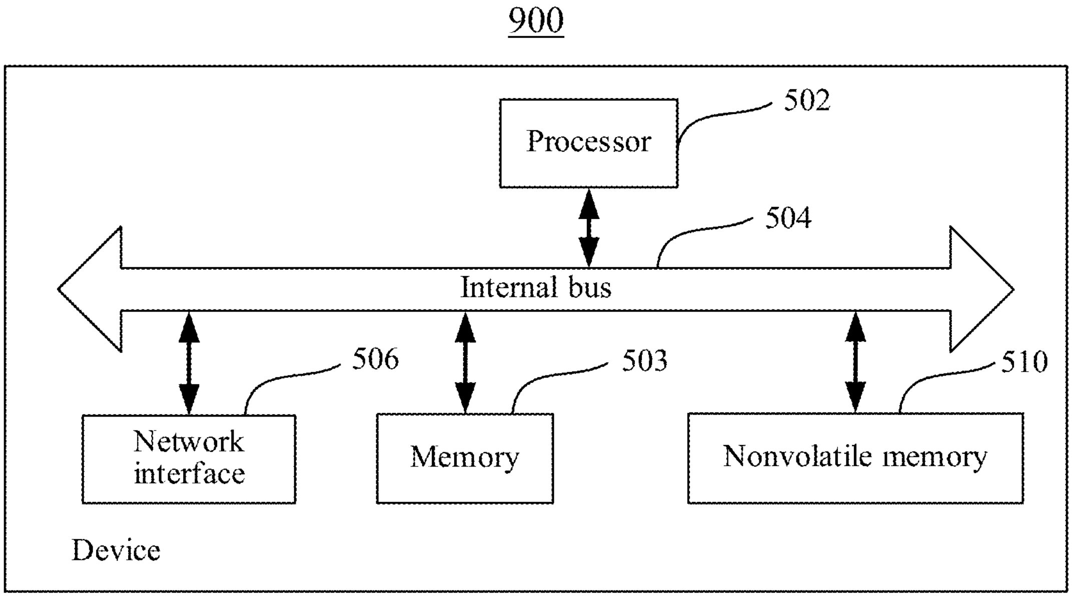
FIG. 9 is a schematic diagram of an exemplary device, according to embodiments of the disclosure.

The various technical features in the above embodiments can be combined arbitrarily, as long as there is no conflict or contradiction between the combinations of the features. Therefore, the arbitrary combination of the various technical features in the above embodiments also falls within the scope of the present disclosure. FIG. 9 is a schematic diagram of an exemplary device 900, according to embodiments of the disclosure. As shown in FIG. 9, at a hardware level, the device 900 includes a processor 502, an internal bus 504, a network interface 506, a memory 503 and a nonvolatile memory 510. Of course, it may further include hardware required for other services. One or more embodiments of the present disclosure can be implemented based on a software mode, for example, the processor 502 reads a corresponding computer program from the nonvolatile memory 510 into the memory 503 and then runs the computer program. In addition to a software implementation, one or more embodiments of the present disclosure do not exclude other implementations, for example, logic devices or a software-hardware combination. That is, execution bodies of the following processing procedures are not limited to logic units and may alternatively be hardware or logic devices.

Figure 10:
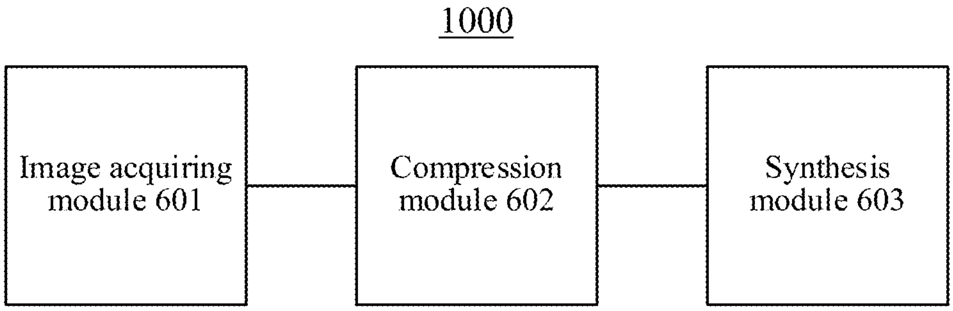
FIG. 10 is a block diagram of an exemplary image synthesis apparatus, according to embodiments of the disclosure.

FIG. 10 is a block diagram of an exemplary image synthesis apparatus 1000, according to embodiments of the disclosure. For example, the image synthesis apparatus 1000 may be applied in the device 900 (FIG. 9) to implement the technical solution of the present disclosure. The image synthesis apparatus 1000 may include: an image acquiring module 601, a compression module 602, and a synthesis module 603.

The image acquiring module 601 is configured to acquire at least two frames of images to be synthesized, the acquired images being divided into a first type of image and a second type of image according to image quality where the image quality of the first type of image is higher.

The compression module 602 is configured to compress the first type of image to obtain a compressed first type of image; and The synthesis module 603 is configured to synthesize the compressed first type of image in the at least two frames of images with the second type of image in the at least two frames of images.

In some embodiments, the apparatus further includes: an image quality statistic module, configured to perform statistical analysis on the image quality of the second type of image in the at least two images to determine a quality characteristic value of the second type of image. The compression module 602 is specifically configured to: compress the first type of image with a goal of reducing the image quality to meet the quality characteristic value.

In some embodiments, the image quality of the images is represented by a quality matrix, and entries in the quality matrix are used for indicating the degree of loss of pixel values of corresponding pixels in the images. The quality characteristic value of the second type of image includes: a statistic value of the numerical values in the quality matrix of the second type of image in the at least two images, and the statistic value includes at least one of an average value, a median and a maximum value.

In some embodiments, the apparatus further includes: an image quality acquiring module, configured to process, as for any image in the at least two frames of images, the image based on a pre-trained image quality evaluation model to obtain the image quality of the image. The image quality evaluation model is obtained through supervised learning using a first training sample set; each training sample of the first training sample set includes a distorted image and a quality matrix label. and the distorted image is obtained by reducing image quality of a first training image, and the quality matrix label of the distorted image is determined according to a difference between the first training image and the distorted image.

In some embodiments, the compression module is specifically configured to determine, as for any first type of image in the at least two images, a compression parameter corresponding to the first type of image according to the first type of image and the quality characteristic value. It then compresses the first type of image by using a preset compression algorithm and the compression parameter. A decline degree of the image quality indicated by the compression parameter is negatively correlated with the image quality of the first type of image and is positively correlated with the quality characteristic value.

In some embodiments, the compression module is specifically configured to process the first type of image and the quality characteristic value based on a pre-trained compression parameter estimation model to obtain the compression parameter corresponding to the first type of image. The compression parameter estimation model is obtained through supervised learning using a second training set; and each training sample in the second training set includes a second training image, a compression parameter label and a quality characteristic value determined according to the second training image and the compression parameter label.

In some embodiments, the at least two frames of images include at least one of the following: one frame in the at least two frames of images being a foreground video frame sent by a client participating in a video conference, and the other frame being a preset background image; the at least two frames of images being video frames sent by at least two clients participating in the video conference respectively; and the at least two frames of images being video frames sent by at least two host clients participating in microphone-connected live broadcast.

Correspondingly, an embodiment of the present disclosure further provides another image synthesis apparatus, including:

- an image acquiring module, configured to acquire at least two frames of images to be synthesized, the at least two frames of images being divided into a first type of image and a second type of image according to image quality where the image quality of the first type of image is higher;
- a processing module, configured to determine a processing parameter for reducing the image quality of the first type of image, and process the first type of image by using the processing parameter; and
- a synthesizing module, configured to synthesize a processing result of the first type of image in the at least two images with the second type of image in the at least two images.

In some embodiments, the apparatus further includes: an image quality statistic module, configured to perform statistical analysis on the image quality of the second type of image in the at least two images to determine a quality characteristic value of the second type of image. The processing parameter is a processing parameter required for reducing the image quality of the first type of image to meet the quality characteristic value.

In some embodiments, the processing parameter includes a blur parameter, and the processing module is specifically configured to perform blur processing on the first type of image by using the blur parameter. And/or, the processing parameter includes a compression parameter, and the processing module is specifically configured to compress the first type of image by using the compression parameter.

Correspondingly, an embodiment of this specifically further provides a video conference apparatus, including:

- an image acquiring module, configured to receive a foreground video frame sent by a client participating in a video conference, and acquire a background image synthesized with the foreground video frame. Image quality of the foreground video frame being lower than image quality of the background image;
- a compression module, configured to compress the background image to obtain a compressed background image; and
- a synthesizing module, configured to synthesize the compressed background image with the foreground video frame to obtain a synthesized video frame sent to the client, the synthesized video frame being used for being displayed in the client.

Correspondingly, an embodiment of the present disclosure further provides another video conference apparatus, including:

- an image acquiring module, configured to receive video frames sent by at least two clients participating in the video conference, at least two video frames being divided into a first type of video frame and a second type of video frame according to image quality where video frame quality of the first type of video frame is higher.

- a compression module, configured to compress the first type of video frame to obtain a compressed first type of video frame; and
- a synthesizing module, configured to synthesize the compressed first type of video frame in the at least two video frames with the second type of video frame in the at least two video frames to generate synthesized video frames sent to each client. The synthesized video frames are used for being displayed in each client.

Reference to the implementation processes of corresponding steps in the foregoing method may be made for details of the implementation processes of the functions and effects of the units in the device. Details are not described herein again.

Because the apparatus embodiments basically correspond to the method embodiments, for related parts, reference may be made to the descriptions in the method embodiments. The foregoing described apparatus embodiments are merely examples. The units described as separate parts may or may not be physically separate, and the parts displayed as units may or may not be physical units, may be in one position, or may be distributed on a plurality of network units. Some or all of the modules may be selected according to actual needs for achieving the objectives of the solutions of this application. A person of ordinary skill in the art may understand and implement the embodiments without creative efforts.

Correspondingly, an embodiment of the present disclosure further provides an electronic device, including:

- a processor; and
- a memory configured to store a processor executable instruction.

The processor runs the executable instruction to implement any above method. The processor includes, but not limited to a central processing unit (CPU), a digital signal processor (DSP), an application specific integrated circuit (ASIC), a field-programmable gate array (FPGA) or the like.

Exemplarily, the memory may include at least one type of storage medium, including a flash memory, a hard disk, a multimedia card, a card type memory (such as an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc and the like.

Correspondingly, an embodiment of the present disclosure further provides a computer-readable storage medium, storing a computer instruction. The instruction, when executed by a processor, implements steps of any above method. For example, the computer-readable storage medium may be a ROM, a RAM, a CD-ROM, a magnetic tape, a floppy disk, an optical data storage device and the like.

Correspondingly, an embodiment of the present disclosure further provides a computer program product, including a computer program. The computer program, when executed by a processor, implements the above method.

The system, the apparatus, the module or the unit described in the foregoing embodiments may be specifically implemented by a computer chip or an entity or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device or a combination of any devices of these devices.

In a typical configuration, the computer includes one or more processors (such as CPUs), an input/output interface, a network interface, and a memory.

The memory may include a form such as a volatile memory, a RAM and/or a non-volatile memory such as a ROM or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information can be a computer-readable instruction, a data structure, a program module, or other data. Examples of a storage medium of a computer include, but are not limited to, a phase-change memory (PRAM), a SRAM, a dynamic random-access memory (DRAM), a RAM of another type, a ROM, an EEPROM, a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which may be configured to store information accessible by a computing device. According to limitations of the present disclosure, the computer-readable medium does not include transitory computer-readable media, such as a modulated data signal and a modulated carrier.

It further needs to be noted that, the term "include", "comprise", or their any other variants is intended to cover a non-exclusive inclusion, so that a process, a method, a product, or a device that includes a series of elements not only includes such elements, but also includes other elements not expressly listed, or further includes elements inherent to such a process, method, product, or device. Unless otherwise specified, an element limited by "include a/an . . . " does not exclude other same elements existing in the process, the method, the article, or the device that includes the element.

Embodiments of the present disclosure are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings are not necessarily performed in the specific order or successively to achieve an expected result. In some implementations, multitasking and parallel processing may be feasible or beneficial.

The terms used in one or more embodiments of the present disclosure are merely used to describe the embodiments but are not intended to limit one or more embodiments of the present disclosure. The "a" and "the" in a singular form used in one or more embodiments of the present disclosure and the appended claims are also intended to include a plural form, unless other meanings are clearly indicated in the context. It should be further understood that the term "and/or" used herein indicates and includes any or all possible combinations of one or more associated listed items.

The foregoing descriptions are merely preferred embodiments of one or more embodiments of the present disclosure but are not intended to limit the one or more embodiments of the present disclosure. Any modification, equivalent replacement, or improvement made within the spirit and principle of one or more embodiments of the present disclosure shall fall within the protection scope of the one or more embodiments of the present disclosure.

The embodiments may further be described using the following clauses:

1. An image synthesis method, comprising:

acquiring a first image and a second image, an image quality of the first image being higher than an image quality of the second image;

obtaining a compressed image by compressing the first image; and synthesizing at least a part of the compressed image with at least a part of the second image.

2. The method according to clause 1, further comprising:

performing statistical analysis on the second image to determine a quality characteristic value of the second image, wherein the compressing the first image comprises:

reducing the image quality of the first image based on the quality characteristic value.

3. The method according to clause 2, wherein:

the image quality of the second image is represented by a quality matrix that comprises a plurality of entries respectively corresponding to a plurality of pixels of the second image, each of the plurality of entries indicating a degree of loss of a corresponding pixel value; and the quality characteristic value of the second image comprises: a statistical value of the plurality of entries, the statistical value comprising at least one of an average value, a median, or a maximum value.

4. The method according to clause 2, wherein reducing the image quality of the first image based on the quality characteristic value comprises:

determining a compression parameter according to the first image and the quality characteristic value; and compressing the first image by using a preset compression algorithm and the compression parameter, wherein the compression parameter indicates a degree of an image quality decline, the degree being:

negatively correlated with the image quality of the first image, and positively correlated with the quality characteristic value.

5. The method according to clause 4, wherein determining the compression parameter according to the first image and the quality characteristic value comprises:

processing the first image and the quality characteristic value based on a pre-trained compression parameter estimation model, to obtain the compression parameter, wherein the compression parameter estimation model is obtained through supervised learning using a training set comprising one or more training samples, each training sample comprising:

a training image, a compression parameter label, and a quality characteristic value determined according to the training image and the compression parameter label.

6. The method according to clause 1, further comprising:

determining the image qualities of the first and second images, based on a pre-trained image quality evaluation model, wherein the image quality evaluation model is pre-trained through supervised learning using a training set comprising one or more training samples, each training sample comprising:

a distorted image, obtained by reducing an image quality of a training image; and a quality matrix label, determined based on a difference between the training image and the distorted image.

7. The method according to clause 1, wherein the first and second images are:

a preset background image, and a foreground video frame sent by a client participating in a video conference, respectively; or video frames sent by two clients participating in a video conference, respectively; or video frames sent by two host clients participating in a microphone-connected live broadcast.

8. An electronic device, comprising:

a memory storing a set of instructions; and one or more processors configured to execute the set of instructions to cause the device to perform:

acquiring a first image and a second image, an image quality of the first image being higher than an image quality of the second image;

obtaining a compressed image by compressing the first image; and synthesizing at least a part of the compressed image with at least a part of the second image.

9. The electronic device according to clause 8, wherein the one or more processors are configured to execute the set of instructions to cause the device to perform:

performing statistical analysis on the second image to determine a quality characteristic value of the second image, wherein the compressing the first image comprises:

reducing the image quality of the first image based on the quality characteristic value.

10. The electronic device according to clause 9, wherein:

the image quality of the second image is represented by a quality matrix that comprises a plurality of entries respectively corresponding to a plurality of pixels of the second image, each of the plurality of entries indicating a degree of loss of a corresponding pixel value; and the quality characteristic value of the second image comprises: a statistical value of the plurality of entries, the statistical value comprising at least one of an average value, a median, or a maximum value.

11. The electronic device according to clause 9, wherein in reducing the image quality of the first image based on the quality characteristic value, the one or more processors are configured to execute the set of instructions to cause the device to perform:

determining a compression parameter according to the first image and the quality characteristic value; and compressing the first image by using a preset compression algorithm and the compression parameter, wherein the compression parameter indicates a degree of an image quality decline, the degree being:

negatively correlated with the image quality of the first image, and positively correlated with the quality characteristic value.

12. The electronic device according to clause 11, wherein determining the compression parameter according to the first image and the quality characteristic value comprises:

processing the first image and the quality characteristic value based on a pre-trained compression parameter estimation model, to obtain the compression parameter, wherein the compression parameter estimation model is obtained through supervised learning using a training set comprising one or more training samples, each training sample comprising:

a training image, a compression parameter label, and a quality characteristic value determined according to the training image and the compression parameter label.

13. The electronic device according to clause 8, wherein the one or more processors are configured to execute the set of instructions to cause the device to perform:

determining the image qualities of the first and second images, based on a pre-trained image quality evaluation model, wherein the image quality evaluation model is pre-trained through supervised learning using a training set comprising one or more training samples, each training sample comprising:

a distorted image, obtained by reducing an image quality of a training image; and a quality matrix label, determined based on a difference between the training image and the distorted image.

14. The electronic device according to clause 8, wherein the first and second images are:

a preset background image, and a foreground video frame sent by a client participating in a video conference, respectively; or video frames sent by two clients participating in a video conference, respectively; or video frames sent by two host clients participating in a microphone-connected live broadcast.

15. A non-transitory computer readable medium storing a set of instructions that is executable by one or more processors of an apparatus to cause the apparatus to execute an image synthesis method, the method comprising:

acquiring a first image and a second image, an image quality of the first image being higher than an image quality of the second image;

obtaining a compressed image by compressing the first image; and synthesizing at least a part of the compressed image with at least a part of the second image.

16. The non-transitory computer readable medium according to clause 15, wherein the method further comprises:

performing statistical analysis on the second image to determine a quality characteristic value of the second image, wherein the compressing the first image comprises:

reducing the image quality of the first image based on the quality characteristic value.

17. The non-transitory computer readable medium according to clause 16, wherein:

the image quality of the second image is represented by a quality matrix that comprises a plurality of entries respectively corresponding to a plurality of pixels of the second image, each of the plurality of entries indicating a degree of loss of a corresponding pixel value; and the quality characteristic value of the second image comprises: a statistical value of the plurality of entries, the statistical value comprising at least one of an average value, a median, or a maximum value.

18. The non-transitory computer readable medium according to clause 16, wherein reducing the image quality of the first image based on the quality characteristic value comprises:

determining a compression parameter according to the first image and the quality characteristic value; and compressing the first image by using a preset compression algorithm and the compression parameter, wherein the compression parameter indicates a degree of an image quality decline, the degree being:

negatively correlated with the image quality of the first image, and positively correlated with the quality characteristic value.

19. The non-transitory computer readable medium according to clause 18, wherein determining the compression parameter according to the first image and the quality characteristic value comprises:

processing the first image and the quality characteristic value based on a pre-trained compression parameter estimation model, to obtain the compression parameter, wherein the compression parameter estimation model is obtained through supervised learning using a training set comprising one or more training samples, each training sample comprising:

a training image, a compression parameter label, and a quality characteristic value determined according to the training image and the compression parameter label.

20. The non-transitory computer readable medium according to clause 15, wherein the method further comprises:

determining the image qualities of the first and second images, based on a pre-trained image quality evaluation model, wherein the image quality evaluation model is pre-trained through supervised learning using a training set comprising one or more training samples, each training sample comprising:

a distorted image, obtained by reducing an image quality of a training image; and a quality matrix label, determined based on a difference between the training image and the distorted image.

21. The non-transitory computer readable medium according to clause 15, wherein the first and second images are:

a preset background image, and a foreground video frame sent by a client participating in a video conference, respectively; or video frames sent by two clients participating in a video conference, respectively; or video frames sent by two host clients participating in a microphone-connected live broadcast.

22. An image synthesis method, comprising:

acquiring a first image and a second image, an image quality of the first image being higher than an image quality of the second image;

determining a processing parameter for reducing the image quality of the first image, and processing the first image by using the processing parameter; and synthesizing the processed first image with the second image.

23. The method according to clause 22, further comprising:

performing statistical analysis on the image quality of the second image, to determine a quality characteristic value of the second image, wherein the processing of the first image by using the processing parameter reduces the image quality of the first image to meet the quality characteristic value.

24. The method according to clause 22, wherein the processing parameter comprises a blur parameter, and the processing of the first image by using the processing parameter comprises:

performing blur processing on the first image by using the blur parameter.

25. The method according to clause 22, wherein the processing parameter comprises a compression parameter, and the processing of the first image by using the processing parameter comprises:

compressing the first image by using the compression parameter.

26. A video conference method, comprising:

receiving a foreground video frame sent by a client participating in a video conference, and acquiring a background image synthesized with the foreground video frame, an image quality of the foreground video frame being lower than an image quality of the background image;

compressing the background image to obtain a compressed background image;

synthesizing the compressed background image with the foreground video frame to obtain a synthesized video frame; and transmitting the synthesized video frame to the client, the synthesized video frame being used for display by the client.

27. A video conference method, comprising:

receiving video frames sent by at least two clients participating in a video conference; the video frames comprising a first video frame and a second video frame, an video frame quality of the first video frame being higher than a video frame quality of the second video frame;

compressing the first video frame to obtain a compressed first video frame;

synthesizing the compressed first video frame with the second video frame, to generate a synthesized video frame; and transmitting the synthesized video frame to the at least two clients, the synthesized video frames being used for display by the at least two clients.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An image synthesis method, comprising:

acquiring a first image and a second image, an image quality of the first image being higher than an image quality of the second image;

processing the second image using a pre-trained image quality evaluation model to obtain a quality matrix for the second image;

performing statistical analysis of the quality matrix to determine a quality characteristic value of the second image;

determining a compression parameter for the first image based on both the first image and the quality characteristic value;

compressing the first image using the compression parameter to generate a compressed first image and synthesizing at least a part of the compressed first image with at least a part of the second image.

2. The method according to claim 1, wherein:

the quality matrix comprising a plurality of entries respectively corresponding to pixels or image regions each comprising a plurality of pixels of the second image, wherein each entry indicates a degree of image information loss of a corresponding pixel;

the compression parameter indicates an image quality decline degree that is determined based on the quality characteristic value and the image quality of the first image.

3. The method according to claim 1, wherein: performing the statistical analysis comprises computing at least one statistical value from the quality matrix, the statistical value comprising at least one of an average value of the entries, a median value of the entries, or a maximum value of the entries.

4. The method according to claim 1, wherein determining the compression parameter further comprises the first image and the quality characteristic value using a pre-trained compression parameter estimation model and processing the first image and the quality characteristic value using a pre-trained compression parameter estimation model.

5. The method according to claim 4, wherein the compression parameter estimation model is obtained through supervised learning using a training set comprising one or more training samples, each training sample comprising:

a training image;

a compression parameter label corresponding to a lossy compression operation applied to the training image; and a quality characteristic value determined from the training image after application of the compression parameter label.

6. The method according to claim 1, wherein the pre-trained image quality evaluation model is pre-trained through supervised learning using a training set comprising one or more training samples, each training sample comprising:

a distorted image, obtained by reducing image quality of a corresponding training image; and a quality matrix label, determined based on pixel-level differences or region-level differences computed over image regions each comprising a plurality of pixels between the training image and the distorted image.

7. The method according to claim 1, wherein the first and second images comprise images used in a video communication system, the first image comprising at least one of a background image or a video frame received from a first client, and the second image comprising a video frame received from a second client and having undergone lossy compression during transmission.

8. A method according to claim 1, wherein the compressing the first image is replaced by processing the first image using the processing parameter for reducing image quality; and synthesizing the processed first image with the second image.

9. The method according to claim 8, further comprising:

performing statistical analysis on the quality matrix corresponding to the second image, to determine a quality characteristic value of the second image, wherein the processing of the first image by using the processing parameter reduces the image quality of the first image to meet the quality characteristic value.

10. The method according to claim 8, wherein the processing parameter comprises a blur parameter, and the processing of the first image by using the processing parameter comprises:

performing blur processing on the first image by using the blur parameter.

11. The method according to claim 8, wherein the processing parameter comprises a compression parameter, and the processing of the first image by using the processing parameter comprises:

compressing the first image by using the compression parameter.

12. The method according to claim 1, wherein the first image comprises a background image and the second image comprises a foreground video frame sent by a client participating in a video conference, and acquiring a background image synthesized with the foreground video frame, an image quality of the foreground video frame being lower than an image quality of the background image, and further comprising:

compressing the background image to obtain a compressed background image;

synthesizing the compressed background image with the foreground video frame to obtain a synthesized video frame; and transmitting the synthesized video frame to the client, the synthesized video frame being used for display by the client.

13. The method according to claim 1, comprising:

receiving video frames sent by at least two clients participating in a video conference;

compressing the first video frame to obtain a compressed first video frame;

synthesizing the compressed first video frame with the second video frame, to generate a synthesized video frame; and transmitting the synthesized video frame to the at least two clients, the synthesized video frames being used for display by the at least two clients.

14. An electronic device, comprising:

a memory storing a set of instructions; and one or more processors configured to execute the set of instructions to cause the device to perform:

acquiring a first image and a second image, an image quality of the first image being higher than an image quality of the second image;

processing the second image using a pre-trained image quality evaluation model to obtain a quality matrix for the second image;

performing statistical analysis on values of the quality matrix to determine a quality characteristic value of the second image;

determining a compression parameter for the first image based on both the first image and the quality characteristic value;

compressing the first image using a predetermined compression algorithm and the compression parameter to generate a compressed first image and synthesizing at least a part of the compressed first image with at least a part of the second image to generate a synthesized image.

15. A non-transitory computer readable medium storing a set of instructions that is executable by one or more processors of an apparatus to cause the apparatus to execute an image synthesis method, the method comprising:

acquiring a first image and a second image, an image quality of the first image being higher than an image quality of the second image;

processing the second image using a pre-trained image quality evaluation model to obtain a quality matrix for the second image;

performing statistical analysis on values of the quality matrix to determine a quality characteristic value of the second image;

determining a compression parameter for the first image based on both the first image and the quality characteristic value;

compressing the first image using a predetermined compression algorithm and the compression parameter to generate a compressed first image and synthesizing at least a part of the compressed first image with at least a part of the second image to generate a synthesized image.

16. The non-transitory computer readable medium according to claim 15, wherein:

the quality matrix comprising a plurality of entries respectively corresponding to pixels or image regions each comprising a plurality of pixels of the second image, wherein each entry indicates a degree of image information loss of a corresponding pixel; and the compression parameter indicates an image quality decline degree that is determined based on the quality characteristic value and the image quality of the first image.

17. The non-transitory computer readable medium according to claim 15, performing the statistical analysis comprises computing at least one statistical value from the quality matrix, the statistical value comprising at least one of an average value of the entries, a median value of the entries, or a maximum value of the entries.

18. The non-transitory computer readable medium according to claim 15, wherein determining the compression parameter further comprises the first image and the quality characteristic value using a pre-trained compression parameter estimation model and processing the first image and the quality characteristic value using a pre-trained compression parameter estimation model.

19. The non-transitory computer readable medium according to claim 18, wherein the compression parameter estimation model is obtained through supervised learning using a training set comprising one or more training samples, each training sample comprising:

a training image;

a compression parameter label corresponding to a lossy compression operation applied to the training image; and a quality characteristic value determined from the training image after application of the compression parameter label.

20. The non-transitory computer readable medium according to claim 15, wherein the pre-trained image quality evaluation model is pre-trained through supervised learning using a training set comprising one or more training samples, each training sample comprising:

a distorted image, obtained by reducing image quality of a corresponding training image; and a quality matrix label, determined based on pixel-level differences or region-level differences computed over image regions each comprising a plurality of pixels between the training image and the distorted image.

* * * * *